(No Model.) 2 Sheets—Sheet 1.

I. VAN HAGEN.
SHEET METAL SHAPING MACHINE.

No. 257,255. Patented May 2, 1882.

Witnesses
W. C. Coolies
Jno. C. MacGregor

Inventor
Isaac Van Hagen
By Coburn & Thacher
Attorneys (No Model.) 2 Sheets—Sheet 2.
I. VAN HAGEN.
SHEET METAL SHAPING MACHINE.
No. 257,255. Patented May 2, 1882.
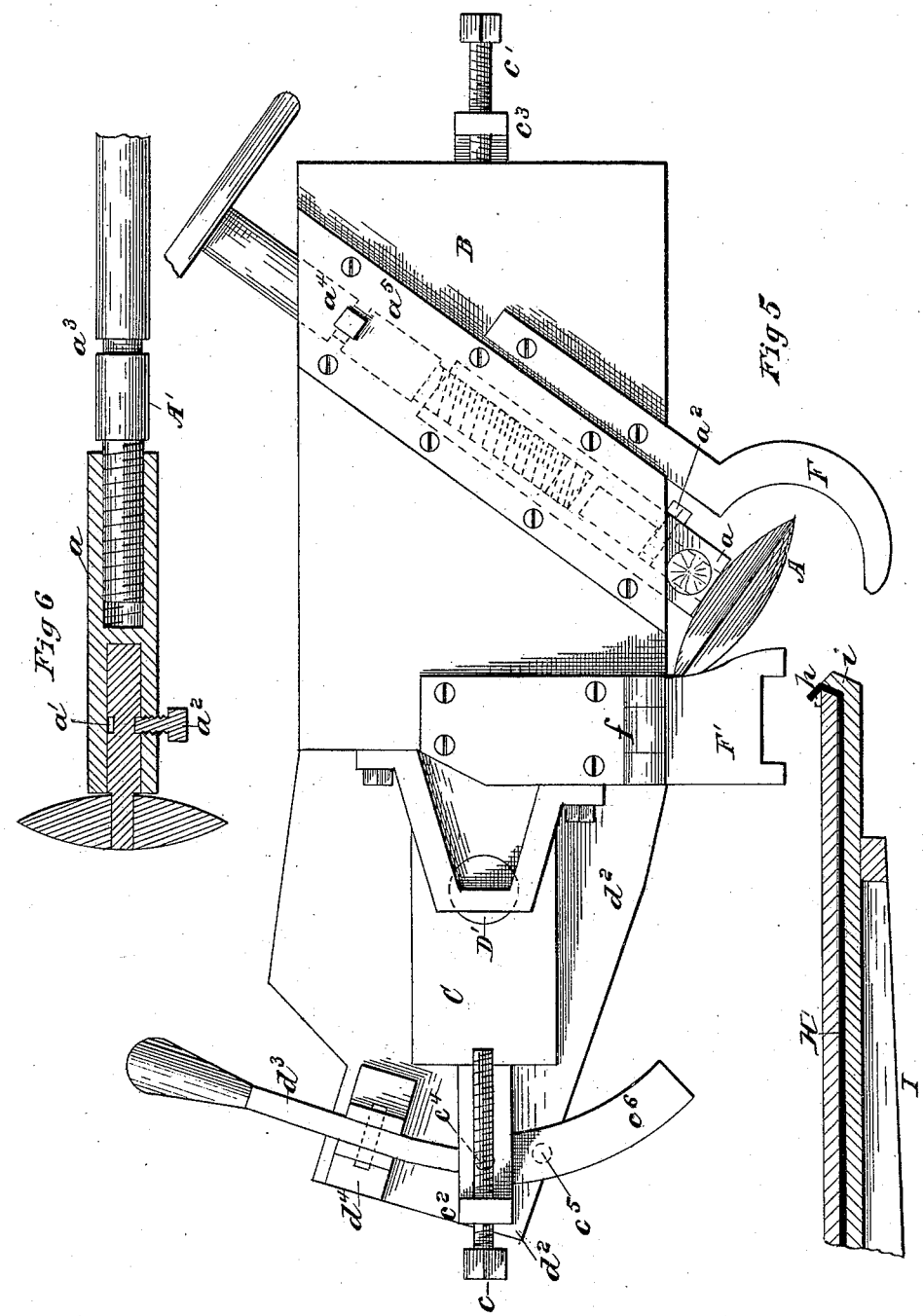
Witnesses
W. C. Coiles
Jno. C. MacGregor
Inventor
Isaac Van Hagen
By Coburn & Thacher
Attorneys.

UNITED STATES PATENT OFFICE.

ISAAC VAN HAGEN, OF CHICAGO, ILLINOIS, ASSIGNOR TO THE ADAMS & WESTLAKE MANUFACTURING COMPANY, OF SAME PLACE.

SHEET-METAL-SHAPING MACHINE.

SPECIFICATION forming part of Letters Patent No. 257,255, dated May 2, 1882.

Application filed December 9, 1881. (No model.)

*To all whom it may concern:*

Be it known that I, ISAAC VAN HAGEN, a citizen of the United States, residing at Chicago, in the county of Cook and State of Illinois, have invented certain new and useful Improvements in Sheet-Metal-Shaping Machines, which are set forth in the following specification, reference being had to the accompanying drawings, in which—

Figure 1:
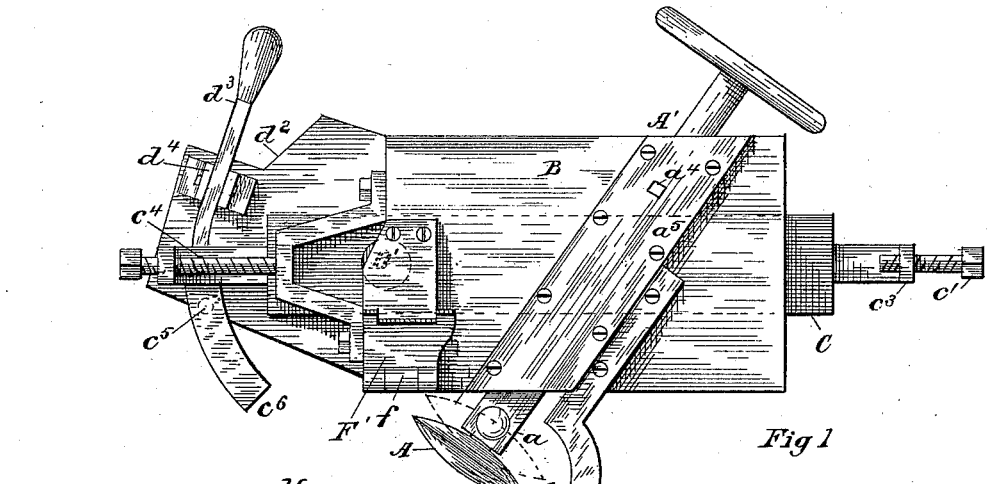
Figure 2:
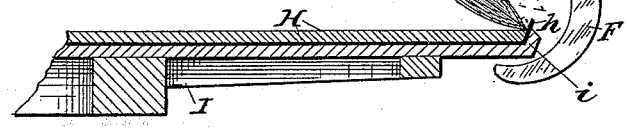
Figure 2:
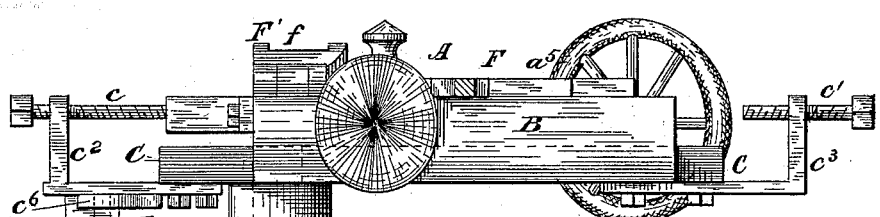
Figure 4:
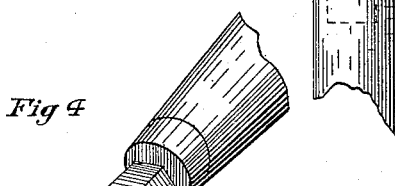
Figure 3:
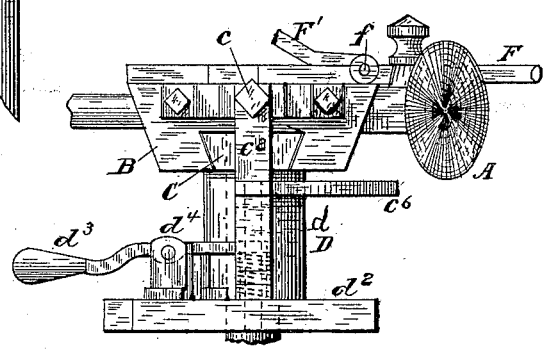

Figure 1 is a plan view of a machine embodying my improvements, the chuck being in section; Fig. 2, a side elevation of the same, the chuck being removed; Fig. 3, an end elevation of the parts shown in Fig. 2; Fig. 4, a detail view of the flanging-tool; Fig. 5, a plan view of the machine, on an enlarged scale, in position for finishing the board, the chuck being in section; Fig. 6, a section of the bevel-wheel with its bearings and adjusting-screw.

My invention relates to a machine for securing partially-flanged stove-board covers to their stove-boards; and it consists of certain devices, hereinafter described and claimed, by means of which a bearing is furnished, against which the first flange of a stove-board cover may itself be flanged in the process of fastening the cover to the stove-board.

In the drawings, A represents a bevel-wheel, mounted in and revolving in the end of a sleeve, $a$, and retained in position therein by an annular groove, $a'$, and the smooth end of the screw-shaft $a^2$, operating in a threaded bearing in the side of the sleeve $a$. The other end of this sleeve is threaded internally to receive the screw-shaft A', which is retained in position longitudinally by its annular groove $a^3$ and the screw-shaft $a^4$, which is similar to the screw-shaft $a^2$. As the screw-shaft $a^4$ has its bearings in the side of a sleeve, $a^5$, which also incloses and sheathes the sleeve $a$, a longitudinal as well as a rotary motion may be imparted to the shaft of the bevel-wheel A. The sleeve $a^5$ is a part of the frame B. The frame B slides longitudinally upon the bed-plate C. The length of the slide is regulated for any given size of covers by the set-screws $c$ $c'$, mounted respectively in brackets $c^2$ $c^3$, secured to the bed-plate C. The bed-plate C is secured to the standard D by means of the pivot D'. The proper angle of the bed-plate in relation to the standard is maintained by the upwardly-pressing spring-pin $d$, which enters the holes $c^4$ and $c^5$ in the arc $c^6$ and rides vertically in a bracket, $d^2$, secured to the standard D. The spring-pin is disengaged by raising the handle of the lever $d^3$, which has its fulcrum on a pivot set in standards $d^4$, rising from the base of the bracket $d^2$.

F and F' are rests for the flanging-tool G while it is held against the flange $h$ of the cover H during the revolution of the chuck I by power applied to its spindle in the usual manner. The rest F' is hinged to the frame B by a pivot, $f$, parallel with and a little back from the edge of the frame, the projecting edge of the frame supporting the rest when the latter is turned down into its working position. The chuck I has a rim, $i$, which makes its dish-shaped face a counterpart of the top and sides of the covered stove-board. The cover, having been previously made dish-shaped, as shown in Fig. 1, is inserted into the counterpart face of the chuck, and after the insertion in it of the stove-board is there held by the retaining-plate of the usual dead-spindle. It will be understood that the blank of sheet metal which is designed for the cover of the stove-board is already dish-shaped when first operated on by this machine, its first flange being turned by other means. This first flange, $h$, is corrugated transversely to its length. Hence the flanging-tool is corrugated correspondingly.

The operation of my invention is as follows: The wheel A and frame B occupy the positions shown in Fig. 5. The rest F' is thrown back on the frame B, so as to occupy the position shown in Fig. 1, to place it out of the way of the advance of the wheel A toward the chuck, and the frame B is made to slide on its bed-plate C until stopped by striking the set-screw $c$. A dish-shaped stove-board cover is now, with its stove-board, secured to the chuck, as above explained, and the rear end of the bed-plate C— that is, that end of it carrying the shaft A'— is inclined toward the chuck, the spring-pin occupying the hole $c^5$ or resting on the arc in that vicinity. The bevel-wheel A is next screwed down to the bottom of the stove-board by the shaft A', the set-screw $c$ being set far enough toward the center of the chuck to allow the wheel A on being screwed down to clear the flange $h$, which is at this stage bent as shown in Fig. 1. Next, the rear end of the bed-plate C is swung away from the chuck until the spring-pin enters the hole $c^4$, the screw-shaft A' being rotated forward at the same time enough to bring the edge of the wheel A against the flange $h$, as shown in Fig. 1, and close against the stove-board. The chuck is now made to revolve in the usual manner, and the wheel of the flanging-tool G is made to ride on the top of the rim $i$ and the edge of the flange $h$ until said flange is laid over the wheel A. After this momentary operation the wheel of the flanging-tool, the chuck continuing to revolve, rides on the inner edge of the top of the rim $i$, with the teeth (through the greater part of their length) sinking into the corrugations of the flange $h$, and, with the progress of the revolution of the chuck toward the latter wheel, forcing down the outer portion of the flange $h$ over the wheel A, thus making a secondary flange. The shank of the flanging-tool is supported during these operations on the rest F. Thus the flange $h$ is changed in cross-section from the shape shown in full lines in Fig. 1 to that shown in dotted lines in the same figure and in full lines in Fig. 5. A crease is thus made in the flange $h$ transversely to its corrugations, and this without crushing in the edge of the stove-board, the wheel A making such crushing impossible, while at the same time its use insures uniformity in the diameter of the finished stove-board and presses together to any desired degree of compactness the wooden cross-strips of which the stove-board proper is composed. After the establishment of this crease transverse to the corrugations no further bending of the flange $h$—or, rather, of its own flange—will take place without the angle being made on the same crease. Hence the bending of the edge of the flange from the position now attained to that shown in dotted lines in Fig. 5 requires no special support other than the bottom of the stove-board itself. Accordingly, nothing now remains but to withdraw the wheel A from beneath the new-made flange and again apply the flanging-tool. To do this the spring-pin is released and the rear end of the bed-plate swung toward the chuck until the spring-pin approaches or enters the hole $c^5$, the wheel A being at the same time screwed back by its screw-shaft A'. These combined motions place the edge of the wheel A nearer the pivot D' of the bed-plate than is any portion of the flange $h$ as now bent. After the wheel A has been thus released from the flange just turned down upon it the rear end of the bed-plate is swung away from the chuck until the spring-pin enters the hole $c^4$, and the rest F' is turned down into the position shown in Fig. 5, the wheel A having been sufficiently withdrawn when last screwed back to admit of this location of the rest. The frame B is now made to slide back against the set-screw $c'$, leaving the machine and the work in the position shown in Fig. 5, and from the rest F' the flanging-tool is applied to the new-made flange of the flange $h$, as last above described, laying it clean over upon and pressing it into the bottom of the stove-board proper, thus giving the secondary flange the position in relation to the stove-board proper which is shown in dotted lines in Fig. 5 and finishing the operation of covering the stove-board.

It is obvious that the wheel A might be changed from the position shown in Fig. 5 to that shown in Fig. 1 without removing the spring-pin from the hole $c^4$ by simply unscrewing the set-screw $c$, to allow the frame B to slide inward enough to permit the wheel A on being screwed down to clear the edge of the flange $h$, and then setting the wheel A back against the flange, as shown in Fig. 1, by screwing up the set-screw $c$. The wheel A may be released from the secondary flange by unscrewing the set-screw $c$, sliding the frame B toward it, and then unscrewing the shaft A'. Thus the pivot D' might be dispensed with.

The reciprocation of the frame B may be entirely dispensed with by keeping it against the set-screw $c$. The only necessity for withdrawing it is simply to place the rest F' in position opposite the flange. The use of this rest and of the flanging-tool may be dispensed with in the final flanging operation by screwing down the wheel A, after releasing it from beneath the secondary flange, so that the periphery of this wheel will ride upon the top of said secondary flange during a revolution of the chuck, this operation finishing the covering of the stove-board proper.

The chuck is provided with the rim $i$ to give a continuous bearing for the cover, to keep it from swerving from the flanging-tool, as well as to support the edge of the stove-board proper when it is made compact by the wheel A.

Having thus described my invention, what I claim as new, and desire to secure by Letters Patent, is—

1. In a sheet-metal-shaping machine, a chuck provided with the rim $i$, in combination with the wheel A, frame B, and tool G, substantially as and for the purpose set forth.

2. In a sheet-metal-shaping machine, a chuck provided with the rim $i$, in combination with the wheel A, frame B, bed-plate C, and tool G, substantially as and for the purpose set forth.

3. In a sheet-metal-shaping machine, a chuck, in combination with the wheel A, screw-shaft A' in line with the pivot of the wheel A, and the reciprocating frame B, substantially as and for the purpose set forth.

4. In a sheet-metal-shaping machine, a chuck, in combination with the wheel A, having a sharp edge at its periphery, substantially as shown, screw-shaft A', frame B, and bed-plate C, having a pivot parallel with the plane of revolution of the wheel A, substantially as and for the purpose set forth.

5. In a sheet-metal-shaping machine, a chuck, in combination with the wheel A, screw-shaft A′ in line with the axis of wheel A, frame B, and bed-plate C, having a pivot parallel with the plane of revolution of the wheel A, substantially as and for the purpose set forth.

6. In a sheet-metal-shaping machine, a chuck, in combination with the wheel A, having a sharp edge at its periphery, substantially as shown, screw-shaft A′, and reciprocating frame B, substantially as and for the purpose set forth.

7. In a sheet-metal-shaping machine, a chuck, in combination with the wheel A, having a sharp edge at its periphery, substantially as shown, screw-shaft A′, frame B, and bed-plate C, substantially as and for the purpose set forth.

8. In a sheet-metal-shaping machine, a chuck, in combination with the wheel A, having a sharp edge at its periphery, substantially as shown, screw-shaft A′, frame B, and bed-plate C, substantially as and for the purpose set forth.

9. In a sheet-metal-shaping machine, a hinged rest, F′, substantially as and for the purpose set forth.

ISAAC VAN HAGEN.

Witnesses:
   JNO. C. MACGREGOR,
   M. B. GAGE.